G. H. GIBSON.
FLOW PROPORTIONING MEANS.
APPLICATION FILED NOV. 9, 1915.
1,174,003.
Patented Feb. 29, 1916.
4 SHEETS—SHEET 1.
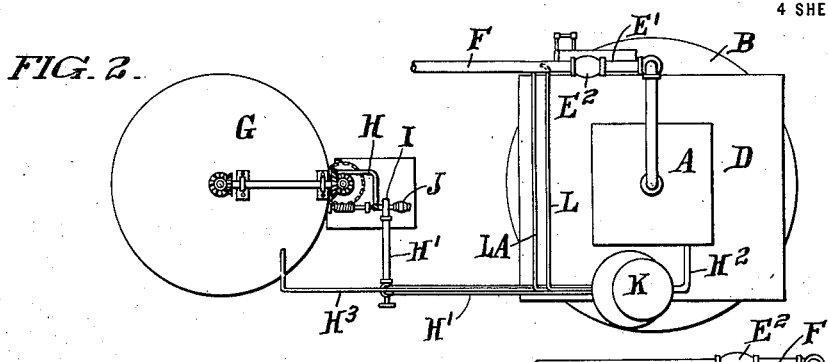
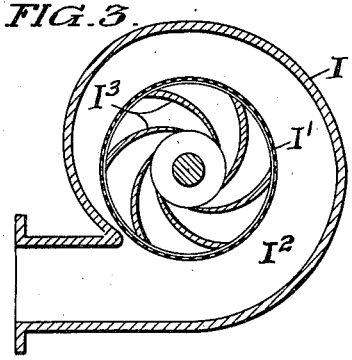
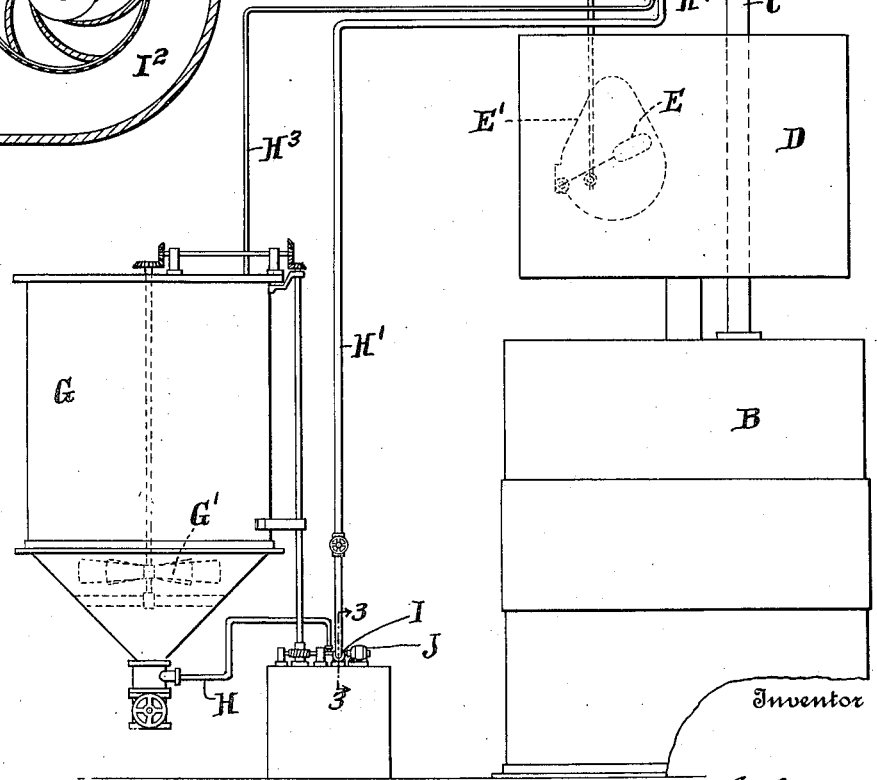
Witness
Daniel Webster Jr.
Inventor
George H. Gibson
By Francis T. Chambers
His Attorney

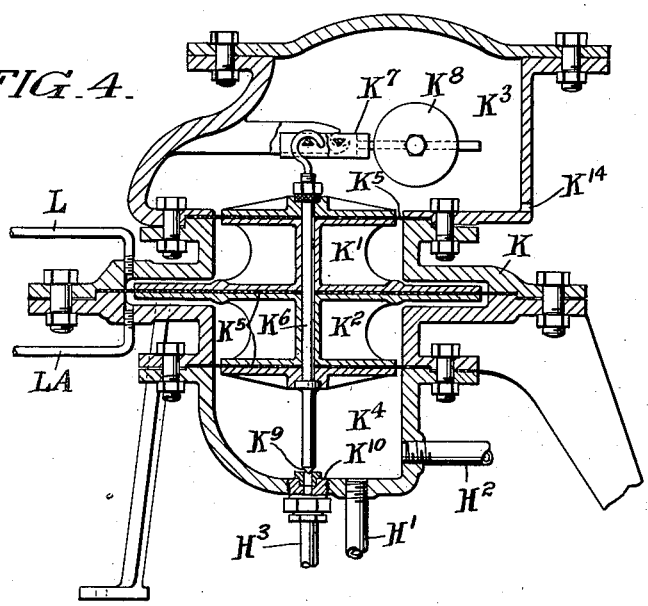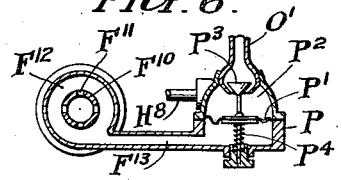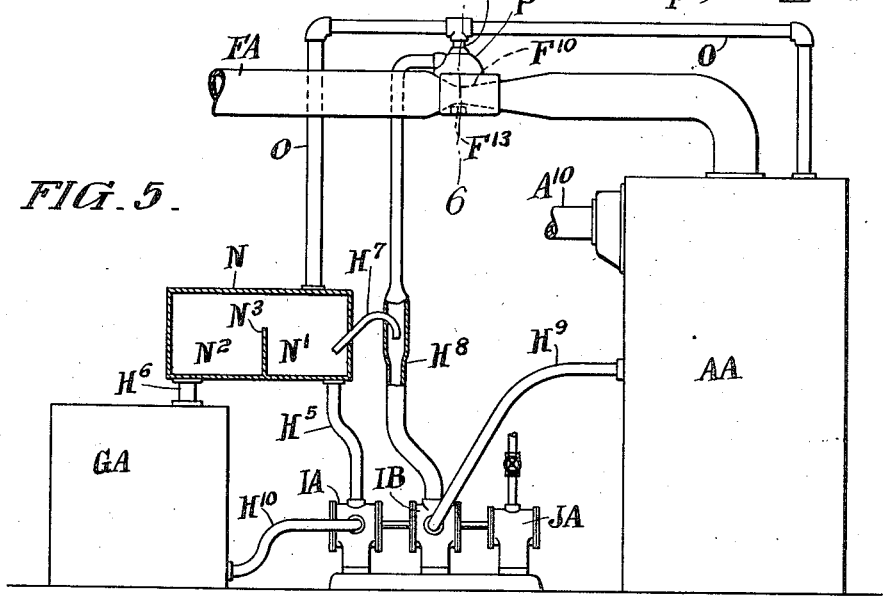

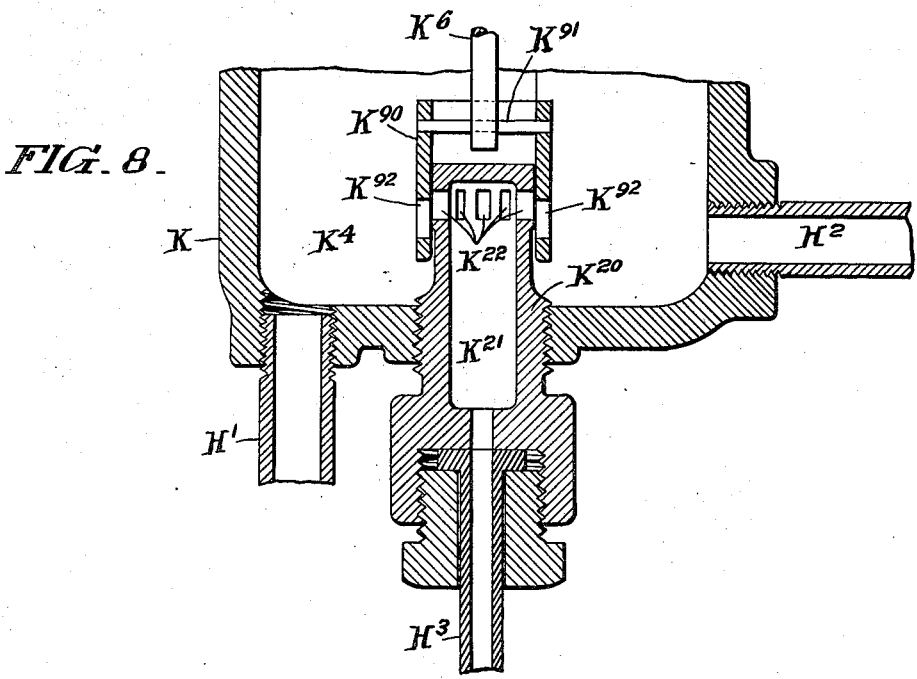
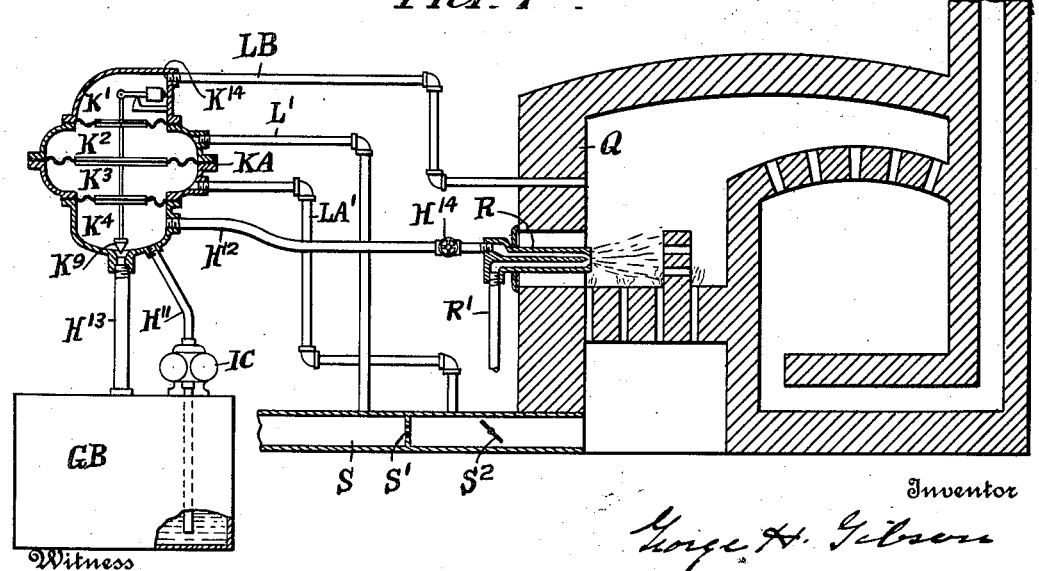

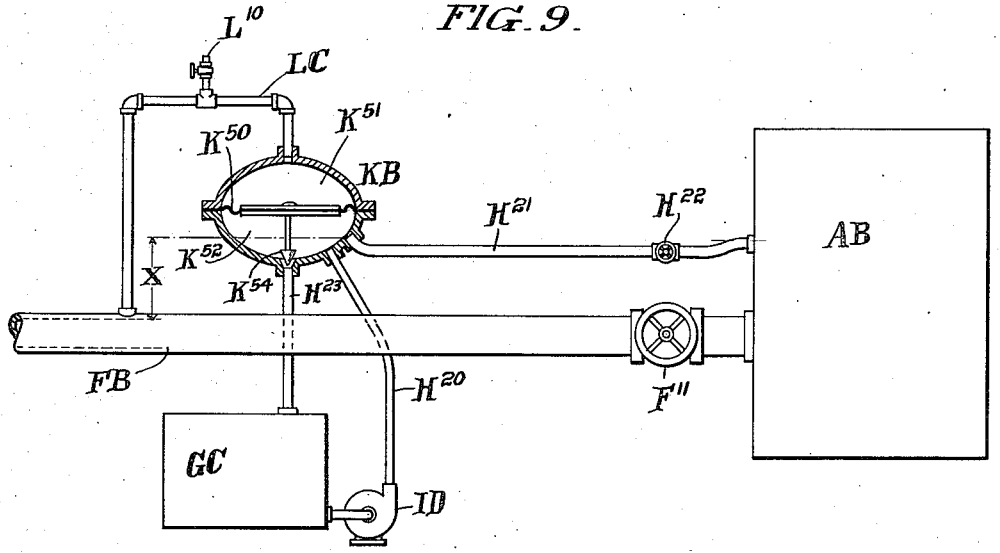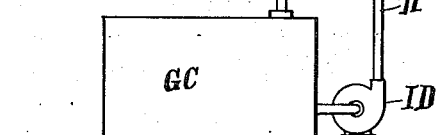

UNITED STATES PATENT OFFICE.

GEORGE H. GIBSON, OF MONTCLAIR, NEW JERSEY.

FLOW-PROPORTIONING MEANS.

1,174,003.   Specification of Letters Patent.   Patented Feb. 29, 1916.

Application filed November 9, 1915. Serial No. 60,622.

*To all whom it may concern:*

Be it known that I, GEORGE H. GIBSON, a citizen of the United States of America, residing in Montclair, in the county of Essex and State of New Jersey, have invented certain new and useful Improvements in Flow-Proportioning Means, of which the following is a true and exact description, reference being had to the accompanying drawings, which form a part thereof.

The primary object of my present invention is to provide improved means for supplying one fluid which I may call the secondary fluid, at a rate proportional to that at which another fluid which I may call the primary fluid, is supplied.

My invention is of especial utility when used in a water purification plant, to supply a chemical purifying re-agent in proportion to the amount of raw water treated. The invention may be used for other purposes, however; for example, it is well adapted for use in proportioning the supplies of fuel oil and air to the combustion space of an oil burning furnace.

In carrying out my invention I employ a pump to pass the chemical purifying re-agent, oil or other secondary fluid from a main reservoir into an auxiliary reservoir at a rate exceeding that at which the secondary fluid needs to be supplied for consumption or use. The proportioned stream of secondary fluid issues from the auxiliary reservoir through a restricted outlet. A second outlet from the auxiliary reservoir permits the return to the main reservoir of the fluid supplied to the auxiliary reservoir in excess of that issuing through the restricted outlet. In combination with the apparatus already referred to I employ means responsive to the rate at which the primary fluid is supplied to automatically maintain such a varying difference in pressures at the opposite sides of the restricted outlet from the auxiliary reservoir that the rate of flow through the restricted outlet will be proportional to the rate at which the primary fluid is supplied.

In some cases I may maintain a constant pressure at the inlet side of the restricted outlet from the auxiliary reservoir and vary the pressure at the delivery side in response to variations in the rate at which the primary fluid is supplied to thereby proportion the supplies of primary and secondary fluids. Ordinarily, however, I prefer to vary the discharge through the restricted outlet from the auxiliary reservoir by varying the pressure in the latter. This I may do by throttling, more or less, either the excess fluid return outlet from the auxiliary reservoir, or the fluid supply connection thereto.

The circulation through the main reservoir, which is an incident of the constant withdrawal from and return to this reservoir of the liquid supplied to the auxiliary reservoir in excess of that passing out of the latter through its restricted outlet is of especial advantage when the liquid thus handled is a chemical re-agent employed in a water purifying system because of the desirable agitation of the contents of the main reservoir thus obtained.

Of the drawings: Figure 1 is a somewhat diagrammatic elevation of a water purifying system in which my invention is utilized; Fig. 2 is a plan of the apparatus shown in Fig. 1; Fig. 3 is a section on the line 3—3 of Fig. 1; Fig. 4 is a sectional elevation of another portion of the apparatus shown in Fig. 1; Fig. 5 is a diagrammatic representation partly in sectional elevation of a modified form of water purifying apparatus; Fig. 6 is a section on the line 6—6 of Fig. 5; Fig. 7 is a diagrammatic representation partly in sectional elevation of oil burning apparatus in which my invention is used; Fig. 8 is a partial sectional elevation taken similarly to Fig. 4, but on a larger scale, illustrating a modified form of pressure regulating waste valve; Fig. 9 is a somewhat diagrammatic representation partly in sectional elevation of a simplified form of apparatus embodying my invention and used as a part of a water purifying plant; and Fig. 10 is a view taken similarly to Fig. 9 illustrating a slight modification of the apparatus shown in Fig. 9.

In Figs. 1 to 4 inclusive I have illustrated the use of my invention for supplying a chemical purifying re-agent to water purifying apparatus at a rate proportional to that at which the raw water treated is supplied. The particular form of water purifying apparatus with which my invention is shown as used in Figs. 1 to 4 comprises an open water heater A, from which the heated water with chemical admixed therewith in the heater passes through the pipe C to the treating and settling tank B and thence through the filter tank D. The float E working in the float box E' attached to the filter tank and communicating therewith, automatically adjusts the valve $E^2$ in the raw water supply pipe F to regulate the supply of raw water to the heater A in response to the water accumulating in the filter chamber D. The chemical supply apparatus proper, in the form shown, comprises a chemical solution tank, or main reservoir G. The chemical solution is withdrawn from the tank G by the rotary pump I through the suction pipe H, and H' represents the delivery pipe from the pump I which leads to the auxiliary reservoir chamber $K^4$ forming a part of the proportioning device K. As shown, the proportioning device K comprises a closed casing or housing divided internally into four superimposed chambers $K'$, $K^2$, $K^3$ and $K^4$, by movable walls in the form of flexible diaphragms $K^5$. Of these diaphragms, the one between chambers $K'$ and $K^2$ is shown as substantially larger than the other two diaphragms which are of the same size. The diaphragms $K^5$ have their central portions rigidly connected to a vertical stem or shaft $K^6$. The latter is connected at its upper end to a counter-balancing lever $K^7$ on which there is mounted an adjustable counter-weight $K^8$. As shown, the lever $K^7$ works in the chamber $K^3$. The lower end of the stem $K^6$ forms a valve $K^9$ adapted to seat against the ported valve member $K^{10}$ which is secured in an opening in the rigid lower wall of the chamber $K^4$. The port through the valve seat member $K^{10}$ is connected by the waste return pipe $H^3$ to the reservoir G. A pipe $H^2$ leading to the interior of the heater A from the chamber $K^4$ provides the restricted flow proportioning outlet from the latter. Preferably the discharge end of the pipe $H^2$ is at the level of the lower diaphragm $K^5$. A valve $H^4$ in the pipe $H^2$ forms a means by which the resistance to flow through the pipe $H^2$ may be adjusted. The chamber $K'$ of the device K is connected by the pipe L to a Pitot tube located in the pipe F and the static pressure of the pipe F is transmitted to the chamber $K^2$ by the pipe LA. As shown, the motor J employed to drive the pump I is also geared to and serves to rotate an agitating or stirring device G' located in the tank G. The pump I, which is of the rotary impeller type, is shown in Fig. 3 as formed with a screen I' surrounding the impeller and forming a pervious barrier between the impeller chamber and the discharge chamber $I^2$ of the pump. This insures the grinding up of any chunks of solid chemical which may be drawn by the pump out of the tank G.

In operation, the differential of the pressures transmitted by the pipes L and LA to the chambers $K'$ and $K^2$ respectively, is a function of the rate of flow of the water passing through the pipe F, and this differential is balanced by the difference between the upwardly acting force due to the pressure of the fluid in the auxiliary chamber $K^4$ and to the pull of the counter-balancing lever $K^7$, and the downwardly acting force due to gravity and to the fluid pressure in the chamber $K^3$. The chamber $K^3$ may, as shown, be freely vented to the atmosphere when the heater A is operated at atmospheric pressure or practically so, but when the pressure in the chamber A varies from atmospheric pressure the chamber $K^3$ of the member K, may advantageously have its vent port $K^{14}$ connected to the vapor space of the heater A by means of a vapor pressure equalizing pipe as the chamber $K'$ of the device KA of Fig. 7 is connected to the furnace combustion chamber by the pipe LB. In either case, assuming the chamber $K^4$ to be full of the chemical solution under pressure, the rate of discharge through the pipe $H^2$ will be a function of the difference between the pressure in the chamber $K^4$ and the pressure at the outlet end of the pipe $H^2$, and will be inversely proportional to the flow resistance of the pipe $H^2$. If the latter is straight and of uniform cross section, its flow resistance will be dependent wholly upon its length and vary inversely with its cross sectional diameter. As shown, however, the flow resistance of the pipe $H^2$ is largely dependent upon the extent to which the port or thoroughfare of the valve $H^4$ is throttled. The pump I forces the chemical from the tank G into the chamber $K^4$ at a rate exceeding the rate of discharge through the pipe $H^2$, and in consequence the differential of the pressures in the chambers $K^4$ and $K^3$ varies with the differential of the pressures in the chambers $K'$ and $K^2$, since the valve $K^9$ is operated to throttle the waste outlet more or less, as required to secure a pressure in the chamber $K^4$ which will balance the resultant of the other forces acting on the diaphragms $K^5$ and stem $K^6$. Since the rate of discharge of chemical into the heater A through the pipe $H^2$, is a function of the difference between the pressures in the chamber $K^4$ and $K^3$ and the rate of flow of the raw water is a function of the differential of the pressures in the chambers $K'$ and $K^2$, it follows that the rate of chemical discharge varies with the rate at which the raw water is supplied. The constant circulation through the tank G resulting from the withdrawal by the pump $H^2$ and the return through pipe $H^3$ of the excess chemical desirably augments the agitation due to the operation of the stirrer $G'$ and in some cases may make the latter unnecessary.

In the modification shown in Figs. 5 and 6, AA represents an open water heater; $A^{10}$ the steam supply pipe for supplying steam to the heater to heat the water supplied thereto by the pipe FA; GA represents the main chemical solution reservoir and N represents the auxiliary reservoir. The lower portion of the latter is divided into two compartments $N'$ and $N^2$ by the weir $N^3$. The reciprocating pump IA operated by the engine JA draws chemical from the tank GA and discharges it through the pipe $H^5$ into the compartment $N'$ of the tank N. Liquid overflowing from the compartment $N'$ into the compartment $N^2$ may escape from the latter back into the tank GA through the open pipe $H^6$. Liquid may also flow from the compartment $N'$ through the pipe $H^7$ into the enlarged lower end of the suction pipe $H^8$ to which the inlet of the reciprocating pump IB, also operated by the engine JA, is connected. The pump IB which should be of ample capacity to handle the maximum discharge through the pipe $H^7$, discharges through the pipe $H^9$ into the heater AA. The pipe O equalizes the vapor pressure in the upper ends of the heater tank AA and chamber N. The raw water supply pipe FA is formed with a Venturi section $F^{10}$. The low pressure portion of the Venturi section is in communication through ports $F^{11}$ with a chamber $F^{12}$ which surrounds the Venturi section. The pressure in the chamber $F^{12}$ is transmitted through the conduit $F^{13}$ to the under side of the diaphragm $P'$ of a differential pressure device P. The branch $O'$ of the vapor equalizing pipe O opens to the chamber $P^2$ of the device P above the diaphragm $P'$ through a port controlled by a valve $P^3$ which is connected to the diaphragm $P'$. $P^4$ represents a spring for balancing the weight of the diaphragm and valve. The chamber $P^2$ is connected to the reduced upper end of the pipe $H^8$.

In the operation of the apparatus shown in Figs. 4 and 5, the pump IA constantly forces chemical into the compartment $N'$ of the tank N at a rate faster than that at which it flows out through the restricted pipe outlet $H^7$. The excess liquid which overflows into the compartment $N^2$ returns to the compartment GA. The rate of flow of chemical through the pipe $H^7$ is a function of the difference between the pressures at the opposite ends of the pipe and this pressure differential is varied in response to changes in the rate of flow through the conduit FA as required to maintain the desired ratio between the two rates of flow.

In Fig. 7 I have illustrated the use of my invention to proportion the supplies of air and oil to the combustion chamber of an oil burning furnace Q, shown as of a type commonly employed as a tempering furnace. In Fig. 7, S represents the conduit through which the air, which in this case is the primary fluid, passes to the combustion space of the furnace. The rate at which air is supplied is controlled by the adjustment of the damper $S^2$ which may be either manually or thermostatically controlled. Located in the pipe S is a diaphragm formed with a restricted port $S'$. Pipes $L'$ and $LA'$ are connected to the conduit S at the inlet and outlet sides respectively of the restricted port $S'$ and lead to the chambers $K^2$ and $K^3$ respectively of a proportioning device KA which may be identical with the device K of Figs. 1 to 4 inclusive. Oil is forced into the auxiliary reservoir $K^4$ from the main reservoir GB by the pump IC, the delivery pipe $H^{11}$ of which takes the place of the pipe $H'$ of the apparatus shown in Figs. 1 to 4. $H^{13}$ represents the return pipe for excess oil leading to the oil reservoir GB from the outlet controlled by the valve $K^9$ of the device KA. The pipe $H^{12}$ containing the adjustable hand valve $H^{14}$ forms the restricted outlet or conduit section through which the chamber $K^4$ is connected to the oil inlet of the oil burner R. The equalizing port $K^{14}$ of the chamber $K'$ is connected by the pipe LB to the combustion chamber of the furnace. $R'$ represents the usual steam supply connection to the burner R. The operation of the apparatus shown in Fig. 7 will be apparent without further explanation.

In some cases it may be desirable to replace the waste valve $K^9$ of the device K by a balanced valve, and such a modification is illustrated in Fig. 8. In this figure, the valve $K^{90}$ replacing the valve $K^9$ of Fig. 4, is in the form of an open ended tube secured to the diaphragm stem by the pin $K^{91}$. Adjacent its lower end a circumferential series of ports $K^{92}$ are formed in the valve member $K^{90}$. The valve member $K^{90}$ loosely surrounds the closed upper end of a hollow fitting $K^{20}$ screwed through the lower wall of the casing of the member K, and taking the place of the valve seat member $K^{10}$ of Fig. 4. Adjacent its upper end, radial ports $K^{22}$ are formed in the fitting $K^{20}$, and the valve ports $K^{92}$ are moved into and out of register with the ports $K^{22}$ as the diaphragms raise and lower. Since some leakage past the valve is not objectionable, it is not necessary for the tubular valve member $K^{90}$ to fit snugly about the upper end of the fitting $K^{20}$, and hence there need be no appreciable frictional resistance to the operation of this balanced valve.

It will be understood, of course, that the balanced valve of Fig. 8 may be used in the device KA as well as in the device K. Those skilled in the art will understand also that many other changes may be made in the form of the apparatus disclosed without departing from the spirit of my invention, and that in some cases certain features of my invention may be used to advantage without a corresponding use of other features. For example I have illustrated in Figs. 9 and 10, forms of apparatus simpler than those already referred to and well adapted for use under some circumstances. In Fig. 9 AB represents the open feed water heater or other tank in which chemical is mixed with the raw water, and FB represents the raw water supply pipe thereto. The chemical proportioning device KB comprises two chambers $K^{51}$ and $K^{52}$ separated by a horizontal diaphragm $K^{50}$. The upper chamber $K^{51}$ is connected by a pipe LC to the water supply pipe FB at the supply side of the throttle valve $F^{11}$ in the latter. $L^{10'}$ represents a valved vent employed to permit the discharge of air from the top of the pipe LC. The lower chamber $K^{52}$ of the device KB is connected to the tank AB by the pipe $H^{21}$, containing the throttle valve $H^{22}$, and is connected to the chemical tank GC by the pipe $H^{20}$ and pump ID and by the waste or return pipe $H^{23}$. A valve $K^{54}$ attached to the diaphragm $K^{50}$ throttles the discharge through the pipe $H^{23}$ more or less and thus regulates the pressure in the auxiliary reservoir chamber $K^{52}$.

With the apparatus shown in Fig. 9, the weight of the diaphragm $K^{50}$ and attached parts, is counter-balanced or compensated for by the negative head X between the level of the upper side of the pipe $H^{21}$, and the level of the upper side of the water supply conduit FB. The apparatus operates to vary the pressure in the chamber $K^{52}$ as the pressure in the chamber $K^{51}$ varies, and thus operates to maintain an approximately constant ratio of flow through the conduits FB and $H^{21}$ for both conduits discharge against the same pressure, namely that of the tank AB. This ratio may be adjusted, of course, by changing the relative adjustment of the throttle valves $F^{11}$ and $H^{22}$.

The apparatus shown in Fig. 10 differs from that shown in Fig. 9 in the form of the proportioning device employed and the manner in which this device is connected to the water supply conduit and to the softening system. The device KC of Fig. 10 comprises three super-imposed chambers $K^{61}$, $K^{62}$ and $K^{63}$. The diaphragm $K^{64}$ separating the chambers $K^{61}$ and $K^{62}$ is appreciably larger than the diaphragm $K^{65}$ separating the chambers $K^{62}$ and $K^{63}$. $K^{66}$ represents an adjustable counter-balancing device located in the intermediate chamber $K^{62}$ and adjustable through the hand hole opening normally closed by the cover $K^{67}$. The chamber $K^{61}$ is connected to the water supply conduit FB at the supply side of the throttle valve $F^{11}$. The chamber $K^{63}$ is connected to the water softening tank AB and the main chemical supply tank GC in the same manner as the chamber $K^{52}$ of Fig. 9. The flow through the waste connection $H^{23}$ is controlled by a balanced valve $K^{68}$ attached to the diaphragms and similar in construction to the valve shown in Fig. 8. The chamber $K^{62}$ is connected to the tank AB by the pressure equalizing pipe LD. The operation of the simple but highly sensitive form of apparatus shown in Fig. 10 will be readily apparent to those skilled in the art without further explanation.

Having now described my invention, what I claim as new and desire to secure by Letters Patent, is:—

1. In combination, a primary fluid supply conduit, a main liquid reservoir, an auxiliary reservoir having a restricted service discharge outlet, means for passing liquid from the main reservoir to the auxiliary reservoir at a rate exceeding the rate of discharge through said service outlet and for returning the excess to said main reservoir, said means comprising a supply connection to said auxiliary reservoir from said main reservoir, a return connection between said reservoirs, and a pump included in one of said connections, and means responsive to the rate of flow through said supply conduit for regulating the difference in pressures at the opposite sides of said restricted outlet and thereby regulating the discharge through said service outlet.

2. In combination, a primary fluid supply conduit, a main liquid reservoir, an auxiliary reservoir having a restricted service discharge outlet, means for passing liquid from the main reservoir to the auxiliary reservoir at a rate exceeding the rate of discharge through said service outlet and for returning the excess to said main reservoir, said means comprising a supply connection to said auxiliary reservoir from said main reservoir, a return connection between said reservoirs, and a pump included in one of said connections, and means responsive to the rate of flow through said supply conduit for regulating the pressure in said auxiliary reservoir and thereby regulating the discharge through said service outlet.

3. In combination, a primary fluid supply conduit, a main liquid reservoir, an auxiliary reservoir having a restricted service discharge outlet, means for passing liquid from the main reservoir to the auxiliary reservoir at a rate exceeding the rate of discharge through said service outlet and for returning the excess to said main reservoir, said means comprising a supply connection to said auxiliary reservoir from said main reservoir, a return connection between said reservoirs, and a pump included in one of said connections, and means responsive to the rate of flow through said supply conduit for throttling one of said connections more or less to thereby regulate the pressure in said auxiliary reservoir and thereby the discharge through said service outlet.

4. In a water purification system, the combination of a raw water supply conduit, a chemical supply reservoir, an auxiliary reservoir having a restricted service discharge outlet, means for passing chemical from the main reservoir to the auxiliary reservoir at a rate exceeding the rate of discharge through said service outlet and for returning the excess to said main reservoir, said means comprising a supply connection to said auxiliary reservoir from said main reservoir, a return connection between said reservoirs, and a pump included in one of said connections, and means responsive to the rate of flow through said conduit for varying the difference between the pressures at the opposite sides of said restricted outlet and thereby regulating the discharge through said service outlet.

5. In a water purification system, the combination of a raw water supply pipe, a chemical supply reservoir, an auxiliary reservoir having a restricted service discharge outlet, means for passing chemical from the main reservoir to the auxiliary reservoir at a rate exceeding the rate of discharge through said service outlet and for returning the excess to said main reservoir, said means comprising a supply connection between said reservoirs, and a pump included in one of said connections, and means responsive to the rate of flow through said conduit to vary the pressure in said auxiliary reservoir and thereby regulate the discharge through said service outlet.

6. In a water purification system, the combination of a raw water supply conduit, a chemical supply reservoir, an auxiliary reservoir having a restricted service discharge outlet, means for passing liquid from the main reservoir to the auxiliary reservoir at a rate exceeding the rate of discharge through said service outlet and for returning the excess to said main reservoir, said means comprising a supply connection to said auxiliary reservoir from said main reservoir, a return connection between said reservoirs, and a pump included in one of said connections, and means responsive to the rate of flow through said supply conduit for throttling said waste outlet more or less as said rate of flow increases and diminishes.

7. A flow proportioning device comprising a casing formed with a pair of chambers separated by a movable horizontal wall and a third chamber having a movable wall coaxial with the first mentioned movable wall and also having a restricted discharge outlet, an inlet and a waste outlet, means rigidly connecting the central portions of said movable walls, an adjustable balancing means connected to said walls, said device including provisions whereby the movements of said movable walls exert a variable throttling effect on said waste outlet.

GEORGE H. GIBSON.